United States Patent
Inbar et al.

(10) Patent No.: US 11,288,201 B2
(45) Date of Patent: Mar. 29, 2022

(54) TECHNIQUES FOR PERFORMING A NON-BLOCKING CONTROL SYNC OPERATION

(71) Applicant: Western Digital Technologies, Inc., San Jose, CA (US)

(72) Inventors: Karin Inbar, Ramat Hasharon (IL); Einat Lev, Rehovot (IL); Roi Kirshenbaum, Hod Hasharon (IL); Ofer Sharon, Tel-Aviv (IL); Uri Peltz, Hod Hasharon (IL); Sergey Anatolievich Gorobets, Edinburgh (GB); Alan David Bennett, Edinburgh (GB); Thomas Hugh Shippey, Edinburgh (GB)

(73) Assignee: WESTERN DIGITAL TECHNOLOGIES, INC., San Jose, CA (US)

( * ) Notice: Subject to any disclaimer, the term of this patent is extended or adjusted under 35 U.S.C. 154(b) by 0 days.

(21) Appl. No.: 16/287,336

(22) Filed: Feb. 27, 2019

(65) Prior Publication Data

US 2019/0196975 A1    Jun. 27, 2019

Related U.S. Application Data

(63) Continuation of application No. 15/440,505, filed on Feb. 23, 2017, now abandoned.

(51) Int. Cl.
| | | |
|---|---|---|
| *G06F 3/06* | (2006.01) | |
| *G06F 12/00* | (2006.01) | |
| *G06F 13/00* | (2006.01) | |
| *G06F 12/10* | (2016.01) | |
| *G06F 12/02* | (2006.01) | |

(52) U.S. Cl.
CPC .............. *G06F 12/10* (2013.01); *G06F 3/064* (2013.01); *G06F 3/0613* (2013.01);
(Continued)

(58) Field of Classification Search
CPC ... G06F 12/0246; G06F 2201/84; G06F 3/065
(Continued)

(56) References Cited

U.S. PATENT DOCUMENTS 5,255,270 A * 10/1993 Yanai .................. G06F 11/1435
                                                          360/53
6,324,495 B1 * 11/2001 Steinman ................ G06F 30/20
                                                          703/17
(Continued)

FOREIGN PATENT DOCUMENTS

CN         1520562 A      8/2004
CN         1542607 A      11/2004
(Continued)

OTHER PUBLICATIONS

Office Action issued in counterpart Korean Patent Application No. 10-2017-0176507, dated Jun. 26, 2019 (12 pages).
(Continued)

*Primary Examiner* — Mohamed M Gebril
(74) *Attorney, Agent, or Firm* — Patterson & Sheridan, LLP; Steven H. Versteeg

(57) ABSTRACT

An apparatus includes a non-volatile memory and a controller coupled to the non-volatile memory. The controller includes an interface configured to send first data to be stored to the non-volatile memory. The controller further includes a control circuit configured to generate updated control information based on storing of the first data to the non-volatile memory. The interface is further configured to concurrently send second data and the updated control information to be stored at the non-volatile memory. The non-volatile memory is configured to store the second data and the updated control information in a non-blocking manner

10 Claims, 9 Drawing Sheets

(52) U.S. Cl.
CPC ........ G06F 3/0679 (2013.01); G06F 12/0246 (2013.01); *G06F 2212/1016* (2013.01); *G06F 2212/65* (2013.01); *G06F 2212/7201* (2013.01); *G06F 2212/7207* (2013.01); *G06F 2212/7208* (2013.01)

(58) Field of Classification Search
USPC ........................................................ 711/165
See application file for complete search history.

(56) References Cited

U.S. PATENT DOCUMENTS

| | | | |
|---|---|---|---|
| 6,526,477 B1 | 2/2003 | Yuan et al. | |
| 6,977,847 B2 | 12/2005 | Lasser et al. | |
| 7,366,826 B2 | 4/2008 | Gorobets et al. | |
| 7,386,655 B2 | 6/2008 | Gorobets et al. | |
| 7,564,721 B2 | 7/2009 | Roohparvar | |
| 7,865,658 B2 | 1/2011 | Lasser et al. | |
| 8,006,047 B2* | 8/2011 | De Souza | G06F 3/0656 711/156 |
| 8,099,569 B2* | 1/2012 | Sugiura | G06F 3/0649 711/161 |
| 8,244,958 B2 | 8/2012 | Lasser | |
| 8,473,963 B2 | 6/2013 | Kottapalli et al. | |
| 8,578,093 B1* | 11/2013 | Dafoe | G06F 3/0604 711/114 |
| 8,904,118 B2 | 12/2014 | Mamidala et al. | |
| 8,966,176 B2 | 2/2015 | Duzly et al. | |
| 9,037,777 B2 | 5/2015 | Sabbag | |
| 9,047,178 B2 | 6/2015 | Talagala et al. | |
| 9,116,791 B2 | 8/2015 | Agami | |
| 9,146,824 B1* | 9/2015 | Chen | G11C 29/44 |
| 9,229,876 B2 | 1/2016 | Slepon | |
| 9,317,366 B2* | 4/2016 | Wang | G06F 12/00 |
| 9,368,218 B2 | 6/2016 | Ziperovich | |
| 9,633,738 B1 | 4/2017 | Guo et al. | |
| 9,817,593 B1* | 11/2017 | Inbar | G11C 14/00 |
| 9,836,392 B2 | 12/2017 | Adachi et al. | |
| 9,927,984 B2* | 3/2018 | Qiu | G06F 3/0632 |
| 9,959,044 B2* | 5/2018 | Liu | G06F 3/0679 |
| 10,209,914 B2 | 2/2019 | Agarwal et al. | |
| 10,228,951 B1* | 3/2019 | Kothari | G06F 9/3842 |
| 10,359,955 B2 | 7/2019 | Inbar et al. | |
| 10,372,351 B2 | 8/2019 | Frid et al. | |
| 10,567,006 B2 | 2/2020 | Hahn et al. | |
| 10,658,045 B1 | 5/2020 | Yang et al. | |
| 2001/0002475 A1* | 5/2001 | Bothwell | G06F 12/0246 711/104 |
| 2004/0103241 A1 | 5/2004 | Chang et al. | |
| 2008/0168252 A1* | 7/2008 | Kunimune | G06F 12/0246 711/173 |
| 2011/0063313 A1* | 3/2011 | Bolz | G06T 1/20 345/531 |
| 2011/0099325 A1* | 4/2011 | Roh | G06F 3/0679 711/103 |
| 2011/0161557 A1* | 6/2011 | Haines | G06F 12/0893 711/103 |
| 2011/0191652 A1* | 8/2011 | Dave | H03M 13/29 714/758 |
| 2011/0296088 A1* | 12/2011 | Duzly | G06F 12/08 711/103 |
| 2011/0302446 A1* | 12/2011 | Becker-Szendy | G06F 11/1076 714/6.1 |
| 2012/0054419 A1 | 3/2012 | Chen et al. | |
| 2012/0072641 A1* | 3/2012 | Suzuki | G06F 12/0246 711/103 |
| 2012/0084490 A1* | 4/2012 | Choi | G11C 16/3418 711/103 |
| 2012/0239853 A1 | 9/2012 | Moshayedi | |
| 2012/0317377 A1* | 12/2012 | Palay | G06F 12/0246 711/154 |
| 2013/0073897 A1 | 3/2013 | Khmelnitsky | |
| 2013/0117750 A1* | 5/2013 | Howes | G06F 9/522 718/102 |
| 2013/0138873 A1* | 5/2013 | Gorobets | G06F 3/064 711/103 |
| 2014/0006858 A1* | 1/2014 | Helfman | G06F 11/1662 714/19 |
| 2014/0033209 A1* | 1/2014 | Lih | G06F 9/466 718/101 |
| 2014/0059270 A1* | 2/2014 | Zaltsman | G06F 13/28 711/103 |
| 2014/0173180 A1 | 6/2014 | D'Abreu et al. | |
| 2014/0181371 A1* | 6/2014 | Thomas | G06F 12/0246 711/103 |
| 2014/0281122 A1 | 9/2014 | Lieber | |
| 2014/0325115 A1* | 10/2014 | Ramsundar | G06F 12/0238 711/102 |
| 2014/0379991 A1 | 12/2014 | Lomet et al. | |
| 2015/0169228 A1* | 6/2015 | Sivasankaran | G06F 3/0688 711/103 |
| 2015/0381206 A1* | 12/2015 | Fainzilber | H03M 13/1108 714/758 |
| 2016/0004634 A1* | 1/2016 | Kim | G06F 12/1408 711/103 |
| 2016/0055084 A1 | 2/2016 | Rangaswami et al. | |
| 2016/0110249 A1* | 4/2016 | Orme | G06F 11/1016 714/6.24 |
| 2016/0124640 A1* | 5/2016 | Park | G06F 12/0802 711/103 |
| 2016/0163392 A1 | 6/2016 | Zhao et al. | |
| 2016/0188212 A1* | 6/2016 | Camp | G06F 3/0688 711/171 |
| 2016/0188223 A1* | 6/2016 | Camp | G06F 12/0868 711/103 |
| 2016/0188231 A1* | 6/2016 | Mittelholzer | G06F 11/1012 714/704 |
| 2016/0299710 A1 | 10/2016 | Chang et al. | |
| 2017/0075623 A1* | 3/2017 | Osh | G06F 3/0685 |
| 2017/0161099 A1* | 6/2017 | Rashid | G06F 13/12 |
| 2017/0201502 A1* | 7/2017 | Sun | G06F 21/6218 |
| 2017/0242584 A1* | 8/2017 | Zhang | G06F 12/0246 |
| 2017/0262034 A1* | 9/2017 | Isaac | G06F 13/4081 |
| 2017/0315919 A1* | 11/2017 | Guthrie | G06F 12/0893 |
| 2017/0315922 A1* | 11/2017 | Guthrie | G06F 9/3004 |
| 2017/0322735 A1 | 11/2017 | Liu et al. | |
| 2018/0004428 A1* | 1/2018 | Seong | G06F 12/128 |
| 2018/0024920 A1 | 1/2018 | Thomas et al. | |
| 2018/0039541 A1* | 2/2018 | Hahn | G06F 3/0619 |
| 2018/0101477 A1* | 4/2018 | Kan | G06F 12/0246 |
| 2018/0143886 A1 | 5/2018 | Liu et al. | |
| 2018/0239532 A1* | 8/2018 | Inbar | G06F 3/0613 |
| 2019/0036704 A1 | 1/2019 | DeVetter et al. | |

FOREIGN PATENT DOCUMENTS

| | | |
|---|---|---|
| CN | 100590608 C | 2/2010 |
| CN | 101674307 A | 3/2010 |
| CN | 104716954 A | 6/2015 |
| CN | 104903842 A | 9/2015 |
| CN | 106055489 A | 10/2016 |
| CN | 106294215 A | 1/2017 |
| EP | 2374063 B1 | 11/2017 |
| KR | 20040038706 A | 5/2004 |
| KR | 10-2011-0118782 A | 11/2011 |
| KR | 20110118782 A | 11/2011 |
| KR | 20130030237 A | 3/2013 |
| KR | 20150096646 A | 8/2015 |
| TW | 201419303 A | 5/2014 |

OTHER PUBLICATIONS

Inbar, et al.; "Block Management In Non-Volatile Memory System With Non-Blocking Control Sync System," U.S. Appl. No. 15/207,212, filed Jul. 11, 2016; 77 pages.

Hahn, et al.; "Data Relocation," U.S. Appl. No. 15/229,252, filed Aug. 5, 2016; 59 pages.

(56) References Cited

OTHER PUBLICATIONS

Written Opinion issued in corresponding Korean Patent Application No. 10-2017-0176507, dated Aug. 22, 2019 (8 pages).
Decision on Registration issued in corresponding Korean Patent Application No. 10-2017-0176507, dated Sep. 18, 2019 (2 pages).
Xiangquan, S., and Jinshu, S., "Research on Network Processors Parallel Processing and Congestion Control Mechanisms in the High Performance Router", Graduate School of National University of Defense Technology, pp. 1-117 (Oct. 2007) (English Abstract).
Kulami et al. "Pre-Erasure of Memory in Storage Devices," U.S. Appl. No. 17/222,459, filed Apr. 5, 2021.

\* cited by examiner

TECHNIQUES FOR PERFORMING A NON-BLOCKING CONTROL SYNC OPERATION

CROSS-REFERENCE TO RELATED APPLICATIONS

This application is a continuation of co-pending U.S. patent application Ser. No. 15/440,505, filed Feb. 23, 2017, which is herein incorporated by reference.

FIELD OF THE DISCLOSURE

This disclosure is generally related to electronic devices and more particularly to data storage devices.

BACKGROUND

Data storage devices enable users to store and retrieve data. Examples of data storage devices include volatile memory devices and non-volatile memory devices. A non-volatile memory device retains data after a power-down event, and a volatile memory device loses data after a power-down event.

A data storage device may store control information associated with data. For example, a data storage device may maintain a management table that indicates a mapping of logical addresses to physical addresses. In some implementations, a management table is maintained in a volatile memory of a controller of a data storage device. The data storage device may update the management table at the volatile memory and may periodically send the management table to a non-volatile memory of the data storage device (e.g., to "back up" the management table at the non-volatile memory using a control update operation).

A data storage device may "block" write operations to a non-volatile memory during a control update operation to create coherency between control tables and host data. For example, when halting write operations processing there is no further update to the control tables, and the data storage device may wait until completion of processing of previously written host data (e.g., during a system idle time) to update the control information.

DETAILED DESCRIPTION

A data storage device in accordance with aspects of the disclosure is configured to use one or more techniques to enable non-blocking control sync (CS) operations. In a non-blocking CS operation, control information (e.g., a mapping table) may be written to a non-volatile memory concurrently with other data.

In an example of a first technique, a data storage device is configured to include an indication in a mapping table of data that has been written "safely" to a non-volatile memory. Data written subsequently to the non-volatile memory may be indicated as being "vulnerable" data. In the event of a power-down event that may jeopardize the "vulnerable" data, the controller may use the indication to identify the vulnerable data and to perform one or more remedial operations, such as by notifying a host device that the data may be unreliable, as an illustrative example.

Alternatively or in addition to the first technique, in an example of a second technique, a data storage device is configured to initiate a non-blocking CS operation based on a barrier command For example, a controller of the data storage device may provide the barrier command to one or more memory dies of the data storage device, and the one or more memory dies may each provide a notification to the controller when the one or more memory dies have completed execution of a first set of memory commands In response to receiving a particular number of one or more messages, the controller may initiate a non-blocking CS operation to write control information to the non-volatile memory. In this case, the barrier command may enable the controller to be "certain" that the control information accurately represents a state of the non-volatile memory (because execution of the barrier command ensures that the first set of operations is completed prior to initiation of the CS operation). Other particular aspects of the disclosure are described below with reference to the drawings.

In the description, common or similar features may be designated by common reference numbers. As used herein, "exemplary" may indicate an example, an implementation, and/or an aspect, and should not be construed as limiting or as indicating a preference or a preferred implementation.

Figure 1:
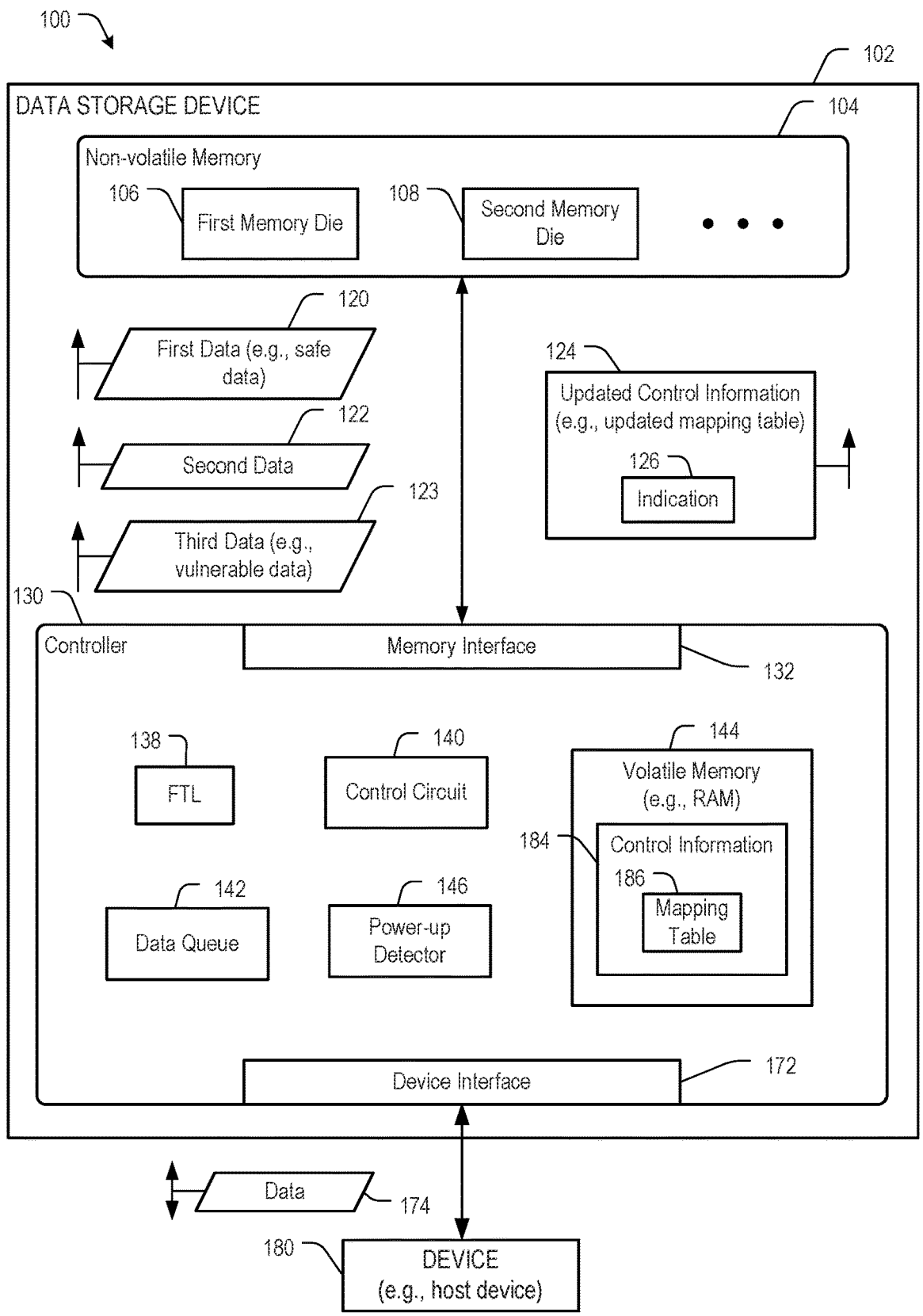
FIG. 1 is a diagram of a first illustrative example of a system that includes a data storage device configured to perform non-blocking control sync operations.

Referring to FIG. 1, a particular illustrative example of system is depicted and generally designated 100. The system 100 includes a data storage device 102 and a device 180 (e.g., a host device or an access device). The data storage device 102 includes a non-volatile memory 104 and a controller 130. The controller 130 is coupled to the non-volatile memory 104.

The non-volatile memory 104 includes a non-volatile array of storage elements included in one or more memory dies, such as a first memory die 106 and a second memory die 108. To further illustrate, the non-volatile memory 104 may include a flash memory (e.g., a NAND flash memory) or a resistive memory, such as a resistive random access memory (ReRAM), as illustrative examples. The non-volatile memory 104 may have a three-dimensional (3D) memory configuration. As used herein, a 3D memory device may include multiple physical levels of storage elements (instead of having a single physical level of storage elements, as in a planar memory device). As an example, the non-volatile memory 104 may have a 3D vertical bit line (VBL) configuration. In a particular implementation, the non-volatile memory 104 has a 3D memory array configuration that is monolithically formed in one or more physical levels of arrays of memory cells having an active area disposed above a silicon substrate. Alternatively, the non-volatile memory 104 may have another configuration, such as a two-dimensional (2D) memory configuration or a non-monolithic 3D memory configuration (e.g., a stacked die 3D memory configuration).

The non-volatile memory 104 includes one or more regions of storage elements. An example of a storage region is a block, such as a NAND flash erase group of storage elements, or a group of resistance-based storage elements in a ReRAM implementation. Another example of a storage region is a word line of storage elements (e.g., a word line of NAND flash storage elements or a word line of resistance-based storage elements). A storage region may have a single-level-cell (SLC) configuration, a multi-level-cell (MLC) configuration, or a tri-level-cell (TLC) configuration, as illustrative examples. Each storage element of the non-volatile memory 104 may be programmable to a state (e.g., a threshold voltage in a flash configuration or a resistive state in a resistive memory configuration) that indicates one or more values. As an example, in an illustrative TLC scheme, a storage element may be programmable to a state that indicates three values. As an additional example, in an illustrative MLC scheme, a storage element may be programmable to a state that indicates two values.

The controller 130 includes a memory interface 132 to the non-volatile memory 104 and further includes a device interface 172 (e.g., a host interface) to the device 180. The controller 130 may further include a flash translation layer (FTL) 138, a control circuit 140, a data queue 142, a volatile memory 144, and a power-up detector 146. The volatile memory 144 may include a random access memory (RAM), as an illustrative example.

During operation, the controller 130 may receive data 174 from the device 180, such as in connection with a request for write access to the non-volatile memory 104. The controller 130 may perform one or more operations based on the data 174 to generate first data 120, such as by encoding the data 174 to generate the first data 120. In some implementations (e.g., a flash memory implementation), the FTL 138 of the controller 130 is configured to perform a logical-to-physical address translation to translate a logical address associated with the data 174 to a physical address associated with the first data 120. The controller 130 may be configured to store (e.g., buffer or "queue") the data 174 at the data queue 142.

The memory interface 132 is configured to send the first data 120 to the non-volatile memory 104. For example, the controller 130 may retrieve the first data 120 from the data queue 142 and may provide the first data 120 to the memory interface 132 to be sent to the non-volatile memory 104. The non-volatile memory 104 may store the first data 120 to a particular region of the non-volatile memory 104 (e.g., by writing the first data 120 to the first memory die 106, to the second memory die 108, to one or more other memory dies, or a combination thereof).

The volatile memory 144 is configured to store control information 184. To illustrate, the control information 184 may include a mapping table 186, and the controller 130 may update the mapping table 186 in response to storing the first data 120 to the non-volatile memory 104, such as by updating the mapping table 186 to indicate that the non-volatile memory 104 stores the first data 120. For example, the control circuit 140 is configured to update the control information 184 to generate updated control information 124 (e.g., an updated mapping table corresponding to an updated version of the mapping table 186) based on storing of the first data 120 to the non-volatile memory 104.

The control circuit 140 may be configured to generate an indication 126 and to include the indication 126 in the updated control information 124. The indication 126 may specify data stored by the non-volatile memory 104 that has been written "safely" to the non-volatile memory 104. For example, the indication 126 may specify that the first data 120 (and other data written to the non-volatile memory 104 prior to the first data 120) corresponds to "safe" (or reliable) data. The indication 126 may specify the first data 120 using a logical address associated with the first data 120, a physical address associated with the first data 120, other information, or a combination thereof. Alternatively or in addition, the indication 126 may specify a "safe point" (or a "sync point"), such as a timestamp, where data written to the non-volatile memory 104 prior to the safe point corresponds to safe data, and where data written to the non-volatile memory 104 after the safe point corresponds to vulnerable data.

The controller 130 may send the updated control information 124 to the non-volatile memory 104 (e.g., to "back up" a copy of the updated control information 124) to enable retrieval of the updated control information 124 (e.g., to enable recovery of the updated control information 124 after a power cycle at the data storage device 102). The updated control information 124 may be sent to the non-volatile memory 104 in connection with a non-blocking control sync (CS) operation (also referred to herein as a control update operation or a control program operation).

In accordance with aspects of the disclosure, the controller 130 is configured to send the updated control information 124 to the non-volatile memory 104 concurrently with other data to be stored at the non-volatile memory 104 (e.g., without "blocking" other accesses to and processes performed by the non-volatile memory 104). In an illustrative example, the memory interface 132 is configured to concurrently send second data 122 and the updated control information 124 to be stored at the non-volatile memory 104. The data queue 142 may be configured to store the second data 122 to be written to the non-volatile memory 104. In a particular example, the controller 130 may be configured to access the second data 122 from the data queue 142 and the updated control information 124 from the volatile memory 144 and to provide the second data 122 and the updated control information 124 to the memory interface 132 concurrently. In an illustrative example, the memory interface 132 is configured to concurrently send the second data 122 to one of the first memory die 106 and the second memory die 108 and to send the updated control information 124 to the other of the first memory die 106 and the second memory die 108.

As used herein, "concurrently" sending the second data 122 and the updated control information 124 may refer to sending the second data 122 and the updated control information 124 using at least one common clock cycle, at least one common packet, or another common technique. To illustrate, the second data 122 and the updated control information 124 may be sent concurrently if at least a portion of the second data 122 and at least a portion of the updated control information 124 are sent during a common clock cycle or using a common packet. In some cases, the memory interface 132 may include a multi-channel bus that is coupled to the non-volatile memory 104, and the second data 122 and the updated control information 124 may be concurrently sent to the non-volatile memory 104 using the multi-channel bus.

The non-volatile memory 104 is configured to store the second data 122 and the updated control information 124 in a non-blocking manner For example, the non-volatile memory 104 may perform a non-blocking CS operation that writes the updated control information 124 to the non-volatile memory 104 without "blocking" writing of the second data 122.

Data that is written to the non-volatile memory 104 after writing of the updated control information 124 may correspond to vulnerable data. To illustrate, the memory interface 132 may be configured to send third data 123 to the non-volatile memory 104 after sending the updated control information 124. The indication 126 may specify that the third data 123 corresponds to vulnerable data. For example, if a power-off event occurs during or after writing of the updated control information 124 to the non-volatile memory 104 and prior to re-updating the control information 184 based on writing of the third data 123, the controller 130 may be unable to determine whether the third data 123 has been programmed successfully (e.g., resulting in "lost" data). Accordingly, the third data 123 may correspond to "vulnerable" data.

Depending on the particular implementation, data that is written to the non-volatile memory 104 concurrently with writing of the updated control information 124 may correspond to "safe" data or to "vulnerable" data. In an illustrative example, the control circuit 140 is configured to access the second data 122 in the data queue 142 during generation of the updated control information 124. In this example, the control circuit 140 may be configured to cause the indication 126 to specify that the second data 122 corresponds to safe data (because the second data 122 is to be programmed concurrently with the updated control information 124). In other implementations, the second data 122 may correspond to vulnerable data.

To further illustrate, the power-up detector 146 may be configured to detect a power-up event at the data storage device 102 that occurs after writing the second data 122 and the updated control information 124 to the non-volatile memory 104. The controller 130 may be configured to perform a scan operation using the updated control information 124 (e.g., using the indication 126) in response to the power-up event to identify the third data 123.

In a particular example of an implicit technique, the indication 126 may implicitly specify that the third data 123 is vulnerable. For example, the indication 126 may indicate that the first data 120 was stored to the non-volatile memory 104 prior to generating the updated control information 124 and that data stored after the first data 120 is vulnerable. The controller 130 may read the first data 120 from the non-volatile memory 104 to determine a particular timestamp associated with the first data 120 and may scan the non-volatile memory 104 for data (e.g., the third data 123) indicating timestamps after the particular timestamp associated with the first data 120.

Depending on the particular implementation, the data storage device 102 may perform one or more operations in response to detecting vulnerable data, such as the second data 122. As an illustrative example, the data storage device 102 may notify the device 180 that the second data 122 is vulnerable due to a power-off event at the data storage device 102.

Operation at the data storage device 102 may continue with one or more memory operations. For example, the data storage device 102 may perform a write operation to write fourth data to the non-volatile memory 104. The data storage device 102 may update the control information 184 to generate a third version of the control information 184 based on programming the fourth data, and the data storage device 102 may concurrently send the third version of the control information 184 and fifth data to be stored at the non-volatile memory 104. The third version of the control information 184 may specify that the fourth data (or the fourth data and the fifth data) corresponds to safe data.

One or more aspects described with reference to FIG. 1 may improve performance at the data storage device 102. For example, the data storage device 102 may perform a CS operation without "blocking" other memory accesses to and processes performed by the non-volatile memory 104 during the non-blocking CS operation, such as by concurrently writing the second data 122 and the updated control information 124 to the non-volatile memory 104. As a result, throughput may be improved as compared to a device that "blocks" memory access operations while storing updated control information.

Figure 2:
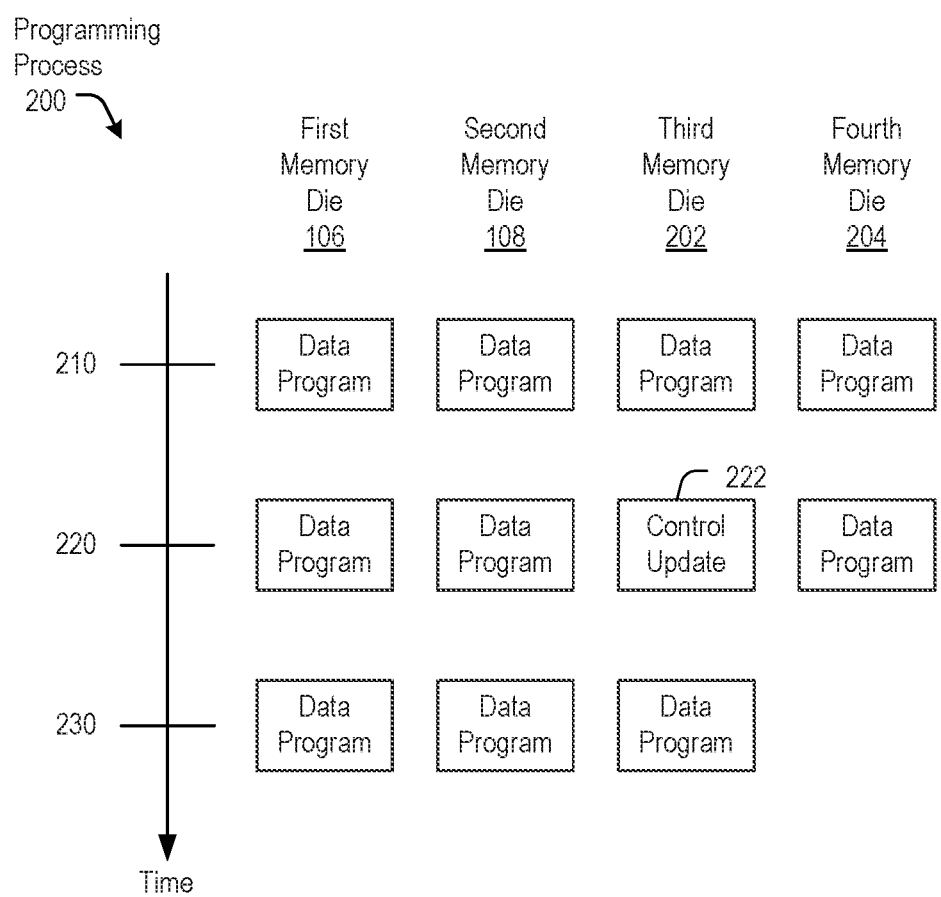
FIG. 2 depicts an illustrative example of a programming process that may be performed at the data storage device of FIG. 1.

Referring to FIG. 2, a particular illustrative example of a programming process is depicted and generally designated 200. The programming process 200 may be performed by the data storage device 102 of FIG. 1. For example, the programming process 200 may be performed using the first memory die 106 and the second memory die 108 of FIG. 1. FIG. 2 also depicts that the programming process 200 may be performed using a third memory die 202 and a fourth memory die 204. The third memory die 202 and the fourth memory die 204 may be included in the non-volatile memory 104 of FIG. 1.

FIG. 2 depicts a first set of data program operations, at 210. For example, data may be programmed to one or more of the memory dies 106, 108, 202, and 204. The data may include the first data 120 of FIG. 1, as an illustrative example.

The programming process 200 further includes concurrently performing a control program operation 222 and one or more data program operations, at 220. For example, FIG. 2 depicts that data program operations may be performed at the first memory die 106, the second memory die 108, and the fourth memory die 204. The data may include the second data 122 of FIG. 1, as an illustrative example. FIG. 2 also depicts that the third memory die 202 may perform the control program operation 222. For example, performing the control program operation 222 may include programming the updated control information 124 of FIG. 1 to the third memory die 202 concurrently with writing of the second data 122 of FIG. 1.

FIG. 2 also shows that a third set of one or more data program operations may be performed, at 230. To illustrate, the first memory die 106, the second memory die 108, and the third memory die 202 may perform data program operations. In an illustrative example, data programmed prior to the control program operation 222 may correspond to safe data. For example, the data programmed at 210 may correspond to safe data, and the indication 126 of FIG. 1 may specify that the data programmed at 210 corresponds to safe data. Data programmed concurrently or after the control program operation 222 may correspond to vulnerable data. For example, data programmed at 230 may correspond to vulnerable data, and the indication 126 of FIG. 1 may specify that the data programmed at 230 corresponds to vulnerable data. Depending on the particular implementation, data programmed concurrently with the control program operation 222 may include safe data or vulnerable data. For example, data programmed at 220 may correspond to either safe data or vulnerable data, and the indication 126 of FIG. 1 may specify that the data programmed at 220 corresponds to either safe data or vulnerable data.

One or more aspects described with reference to FIG. 2 may improve performance at a data storage device, such as the data storage device 102 of FIG. 1. For example, by concurrently performing the control program operation 222 and one or more data program operations, throughput is improved as compared to a device that "blocks" data write operations while storing updated control information.

Figure 3:
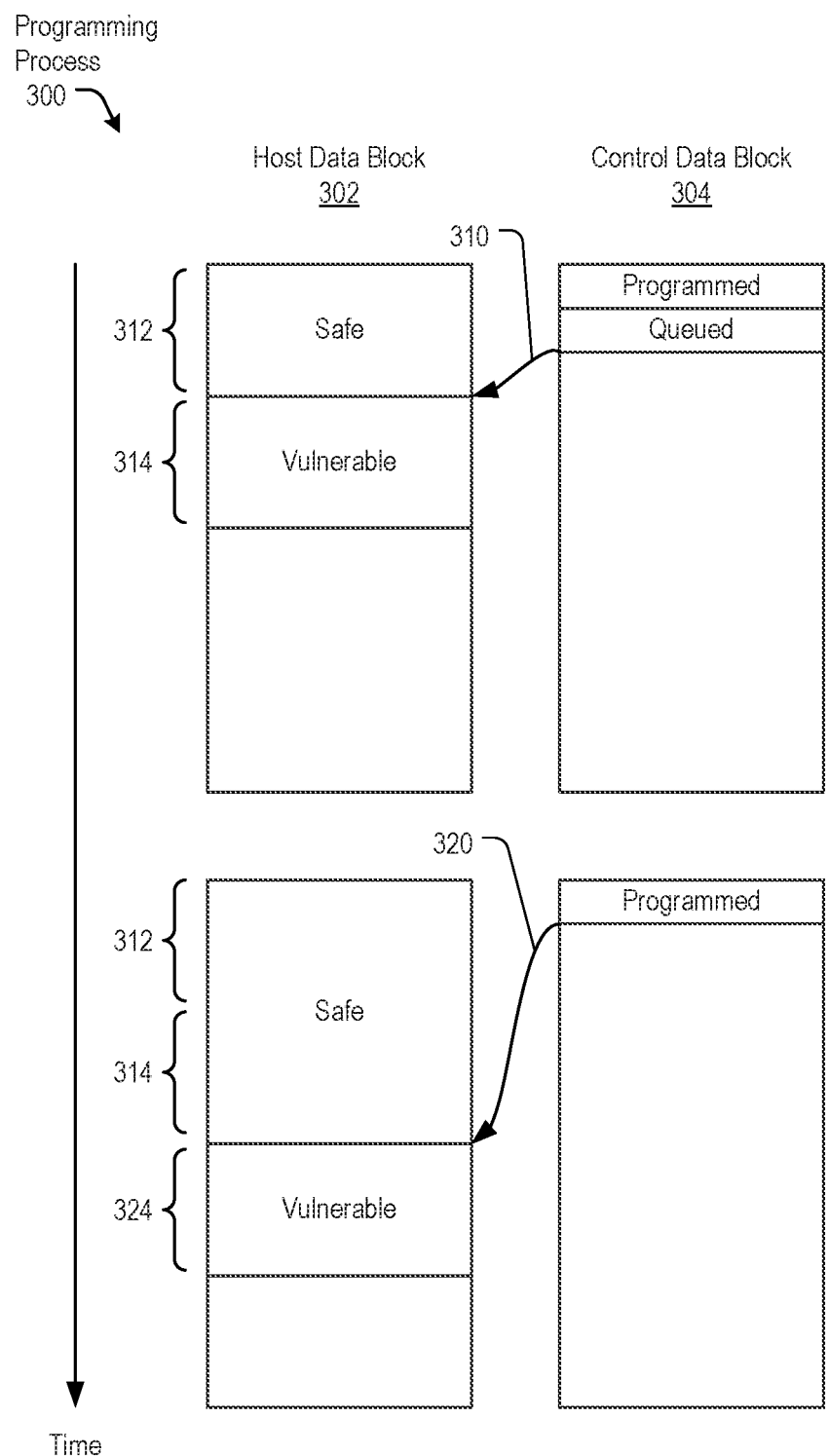
FIG. 3 depicts another illustrative example of a programming process that may be performed at the data storage device of FIG. 1.

Referring to FIG. 3, another particular illustrative example of a programming process is depicted and generally designated 300. The programming process 300 depicts operations associated with a host data block 302 and a control data block 304. For example, the host data block 302 may correspond to a region (e.g., a physical region, a logical region, or a virtual region) of the non-volatile memory 104, and the control data block 304 may correspond to another region (e.g., a physical region, a logical region, or a virtual region) of the non-volatile memory 104.

The programming process 300 may include performing a first control update, at 310. The first control update may include storing the updated control information 124 to the non-volatile memory 104 of FIG. 1. The control update may correspond to the control update operation 222 of FIG. 2. The updated control information 124 may include the indication 126, and the indication 126 may specify that data programmed prior to performing the first control update includes safe data 312. The indication 126 may further specify that data programmed after performing the first control update may include vulnerable data 314.

The programming process 300 further includes performing a second control update, at 320. The second control update may include storing a re-updated version of the control information 184 of FIG. 1 to the non-volatile memory 104 of FIG. 1. By re-updating the control information 184, the re-updated control information may include an indication that data programmed to the non-volatile memory 104 prior to re-updating the control information 184 corresponds to safe data. For example, the vulnerable data 314 may be reclassified as safe data. Further, data programmed after the second control update may be indicated as being vulnerable. For example, data 324 programmed after the second control update may be indicated as being vulnerable.

FIG. 3 illustrates that control update operations may be used to indicate safe data, vulnerable data, or both. The control update operations may "re-classify" data previously indicated as being vulnerable.

Figure 4:
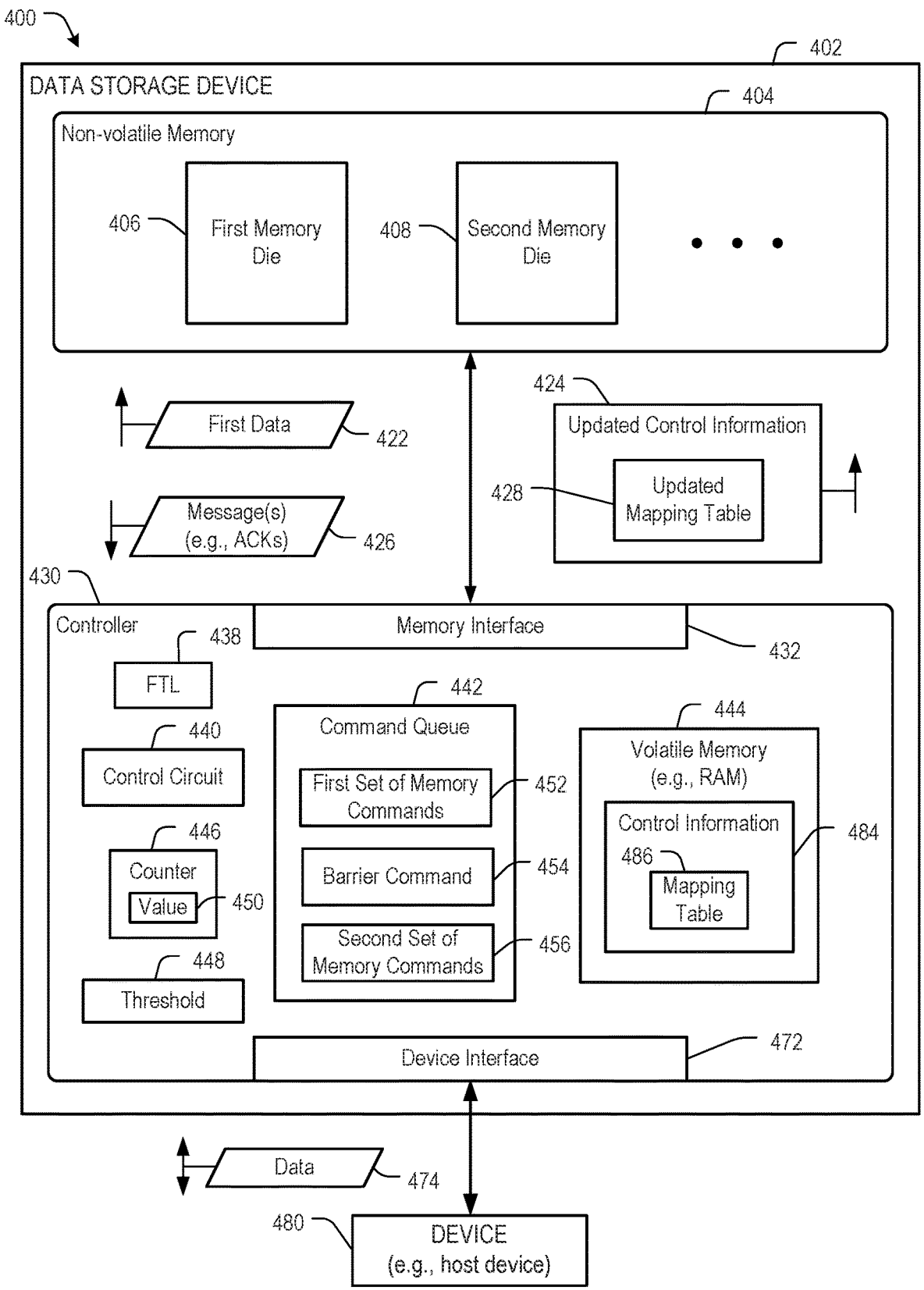
FIG. 4 is a diagram of a second illustrative example of a system that includes a data storage device configured to perform non-blocking control sync operations.

Referring to FIG. 4, a particular illustrative example of system is depicted and generally designated 400. The system 400 includes a data storage device 402 and a device 480 (e.g., a host device or an access device). The data storage device 402 includes a non-volatile memory 404 and a controller 430. The controller 430 is coupled to the non-volatile memory 404.

The non-volatile memory 404 includes a non-volatile array of storage elements included in one or more memory dies, such as a first memory die 406 and a second memory die 408. In an illustrative example, the first memory die 406 and the second memory die 408 correspond to the first memory die 106 and the second memory die 108 of FIG. 1.

The controller 430 includes a memory interface 432 to the non-volatile memory 404 and further includes a device interface 472 (e.g., a host interface) to the device 480. The controller 430 may further include a flash translation layer (FTL) 438, a control circuit 440, a command queue 442, a volatile memory 444, and a counter 446. The volatile memory 444 may include a random access memory (RAM), as an illustrative example.

During operation, the controller 430 may receive data 474 from the device 480, such as in connection with a request for write access to the non-volatile memory 404. The controller 430 may perform one or more operations based on the data 474 to generate first data 422, such as by encoding the data 474 to generate the first data 422. In some implementations (e.g., a flash memory implementation), the FTL 438 of the controller 430 is configured to perform a logical-to-physical address translation to translate a logical address associated with the data 474 to a physical address associated with the first data 422.

To initiate storing of the first data 422 to the non-volatile memory 404, the controller 430 is configured to queue one or more memory commands at the command queue 442. For example, the controller 430 may be configured to queue a first set of memory commands 452 at the command queue 442 to initiate storing of the first data 422 at the non-volatile memory 404. Depending on the particular example, the first set of memory commands 452 may target one or memory dies of the non-volatile memory 404, such as the first memory die 406, the second memory die 408, one or more other memory dies, or a combination thereof.

The volatile memory 444 is configured to store control information 484. To illustrate, the control information 484 may include a mapping table 486, and the controller 430 may update the mapping table 486 to generate an updated mapping table 428 in response to storing data to the non-volatile memory 404, such as by updating the mapping table 486 to indicate that the non-volatile memory 404 stores the first data 422. The control circuit 440 may be configured to generate the updated control information 424 based on storing of the first data 422 to the non-volatile memory 404.

To preserve integrity of the updated control information 424 (e.g., after a power cycle at the data storage device 402), the controller 430 may send the updated control information 424 to the non-volatile memory 404 (e.g., to "back up" a copy of the updated control information 424). The updated control information 424 may be sent to the non-volatile memory 404 in connection with a non-blocking control sync (CS) operation (also referred to herein as a control update operation).

In accordance with aspects of the disclosure, the controller 430 may be configured to provide a barrier command 454 to the command queue 442 following the first set of memory commands 452. The barrier command 454 may enable the first set of memory commands 452 to be executed prior to sending the updated control information 424 to be stored at the one or more memory dies. For example, if the controller 430 issues the barrier command 454 to both the memory dies 406, 408, the controller 430 may receive completion acknowledgements (ACKs) from the memory dies 406, 408 upon execution of the barrier command 454 by the memory dies 406, 408. In this case, the completion ACKs may indicate that the memory dies 406, 408 have executed the first set of memory commands 452. As a result, the controller 430 may store the updated control information 424 in response to determining (based on the completion ACKs) that the first set of memory commands 452 has been completed (and that the updated control information 424 accurately represents a state of the non-volatile memory 404). In an illustrative example, the memory dies 406 and 408 are configured to continue processing of commands from the command queue 442 with little or no delay immediately after execution of the barrier command 454. In this example, the control sync operation is a non-blocking operation.

To further illustrate, the controller 430 may initiate execution of the first set of memory commands 452 by providing the first set of memory commands 452 to the non-volatile memory 404. The controller 430 may provide the barrier command 454 to the non-volatile memory 404 after providing the first set of memory commands 452 to the non-volatile memory 404. Memory commands of the first set of memory commands 452 may be provided to the first memory die 406, to the second memory die 408, to one or more other memory dies of the non-volatile memory 404, or a combination thereof.

Upon executing one or more memory commands of the first set of memory commands 452, a memory die of the non-volatile memory 404 may execute the barrier command 454. In response to executing the barrier command 454, a memory die of the non-volatile memory 404 may provide a message (e.g., a completion ACK) to the controller 430. To illustrate, FIG. 4 depicts that the controller 430 may receive one or more messages 426 from the non-volatile memory 404. The one or more messages 426 are associated with the barrier command 454 and may include completion ACKs from one or more of the memory dies 406, 408. For example, in response to the first memory die 406 executing the barrier command 454, the first memory die 406 may provide a first message of the one or more messages 426 to the controller 430. As another example, in response to the second memory die 408 executing the barrier command 454, the second memory die 408 may provide a second message of the one or more messages 426 to the controller 430.

The controller 430 may be configured to adjust a value 450 indicated by the counter 446 in response to receiving each of the one or more messages 426. Depending on the particular example, the controller 430 may receive the one or more messages 426 concurrently or sequentially. As an illustrative example, the controller 430 may receive the one or more messages 426 sequentially based on different workloads and write speeds of the memory dies 406, 408.

The controller 430 is configured to determine whether a condition associated with the barrier command 454 is satisfied, such as whether a number of the one or more messages 426 satisfies a threshold 448. In an illustrative example, the threshold 448 corresponds to a number of memory dies of the non-volatile memory 104 that are to execute the barrier command 454. In this example, the threshold 448 may correspond to a number of "expected" completion ACKs to be received from the non-volatile memory 404 (based on the number of memory dies of the non-volatile memory 404 that receive the barrier command 454). The controller 430 may monitor a number of received completion ACKs using the value 450 (e.g., by incrementing the value 450 in response to each received completion ACK).

The controller 430 may be configured to compare the value 450 to the threshold 448 to determine whether the number satisfies (e.g., is greater than or is greater than or equal to) the threshold 448. As an illustrative example, the control circuit 440 may include a comparator circuit coupled to the counter 446. The comparator circuit may be configured to compare the value 450 to the threshold 448 to determine whether the number satisfies the threshold 448.

If the number fails to satisfy the threshold 448, the controller 430 may determine that the condition is unsatisfied. As a result, the controller 430 may wait to receive at least one other message of the one or more messages 426. As an illustrative example, if the barrier command 454 is provided to both the memory dies 406, 408, then the threshold 448 may correspond to two, and a number equal to zero or to one fails to satisfy the threshold 448.

Alternatively, if the number of the one or more messages 426 satisfies the threshold 448, the controller 430 may determine that the condition associated with the barrier command 454 is satisfied. To illustrate, if the barrier command 454 is provided to both the memory dies 406, 408, then the threshold 448 may correspond to two, and a number equal to two satisfies the threshold 448. In this example, the controller 430 may determine that each the first set of memory commands 452 has been executed and that the updated control information 424 accurately reflects a state of the non-volatile memory 404 (due to execution of the first set of memory commands 452). In this case, the controller 430 is configured to send the updated control information 424 to be stored at the non-volatile memory 404 in response to the number of the one or more messages 426 satisfying the threshold 448.

The barrier command 454 may be referred to as a "control sync mark." The barrier command 454 follows the first set of memory commands 452, and completion of execution of the barrier command ensures that the first set of memory commands 452 is executed prior to writing the updated control information 424. The second set of memory commands 456 may be provided to the non-volatile memory 404 in parallel with the barrier command 454 (e.g., so that execution of a CS operation does not "block" write commands to the non-volatile memory 404).

In connection with the example of FIG. 4, a CS operation is performed by the data storage device 402 in a non-blocking manner For example, one or more memory access operations may be performed concurrently with sending of the updated control information 424 to the non-volatile memory 404. To further illustrate, in some implementations, one or more memory commands of the second set of memory commands 456 may be sent to the non-volatile memory 404 concurrently with sending of the updated control information 424, such as by using a multi-channel bus that may be included in the memory interface 432.

One or more aspects described with reference to FIG. 4 may improve performance at the data storage device 402. For example, the data storage device 402 is configured to perform a CS operation without "blocking" other memory access operations during the non-blocking CS operation. As a result, throughput may be improved as compared to a device that "blocks" memory access operations while storing updated control information.

Figure 5:
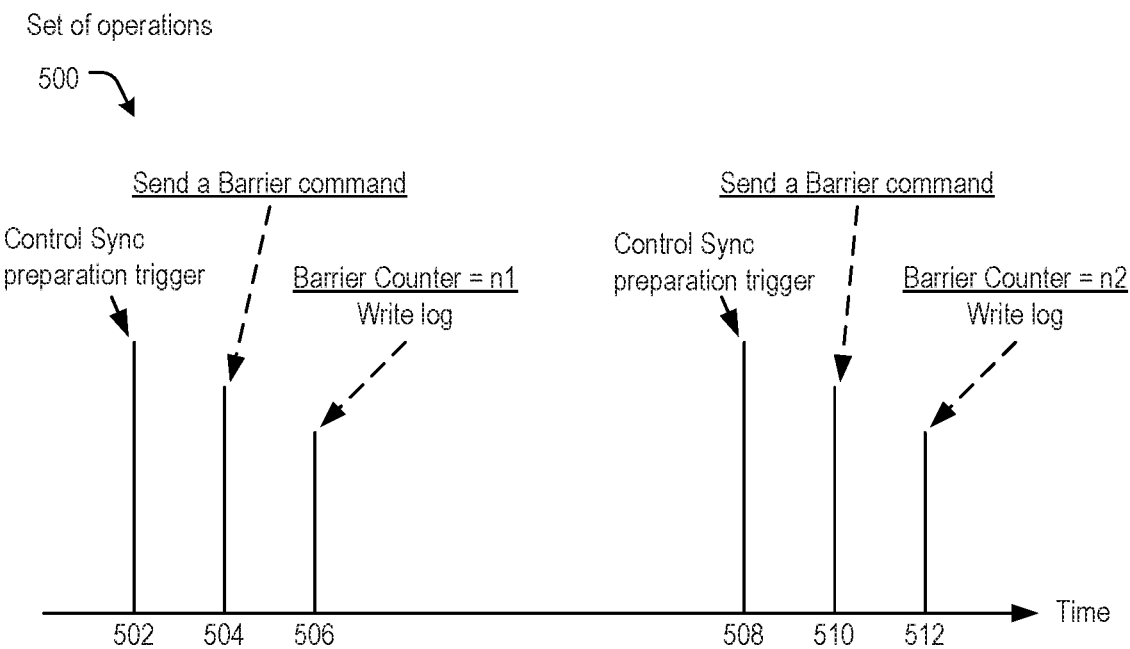
FIG. 5 depicts a set of operations that may be performed by the data storage device of FIG. 4.

Referring to FIG. 5, illustrative aspects of a set of operations are depicted and generally designated 500. The set of operations 500 may be performed at the data storage device 402 of FIG. 4, as an illustrative example.

The set of operations 500 may include detecting a trigger event, at 502. The trigger event may correspond to a condition that indicates the control information 484 is to be updated and stored at the non-volatile memory 404. For example, the trigger condition may correspond to a particular number of operations at the non-volatile memory 404, a threshold time duration since previously updating and storing the control information 484, one or more other conditions, or a combination thereof.

The set of operations 500 further include sending a barrier command, at 504. For example, the controller 430 may send the barrier command 454 to the non-volatile memory 404.

The set of operations 500 further includes writing a log, at 506. For example, the log may include the updated control information 424, and the log may be written to the non-volatile memory 404. The log may be written to the non-volatile memory 404 in response to determining that a number of the one or more messages 426 satisfies the threshold 448.

The set of operations 500 further includes detecting a trigger event, at 508. For example, the trigger event may be detected in response to performing a particular number of operations at the non-volatile memory 404, a threshold time duration since previously updating and storing the control information 484 (e.g., at 506), one or more other conditions, or a combination thereof.

The set of operations 500 further includes sending a barrier command, at 510. For example, another barrier command corresponding to the barrier command 454 may be provided by the controller 430 to the non-volatile memory 404, such as in connection with re-updating the control information 484.

The set of operations 500 further includes writing a log, at 512. For example, the control information 484 may be re-updated based on one or more memory operations performed at the non-volatile memory 404, and the re-updated control information may be provided to the non-volatile memory 404.

Figure 6:
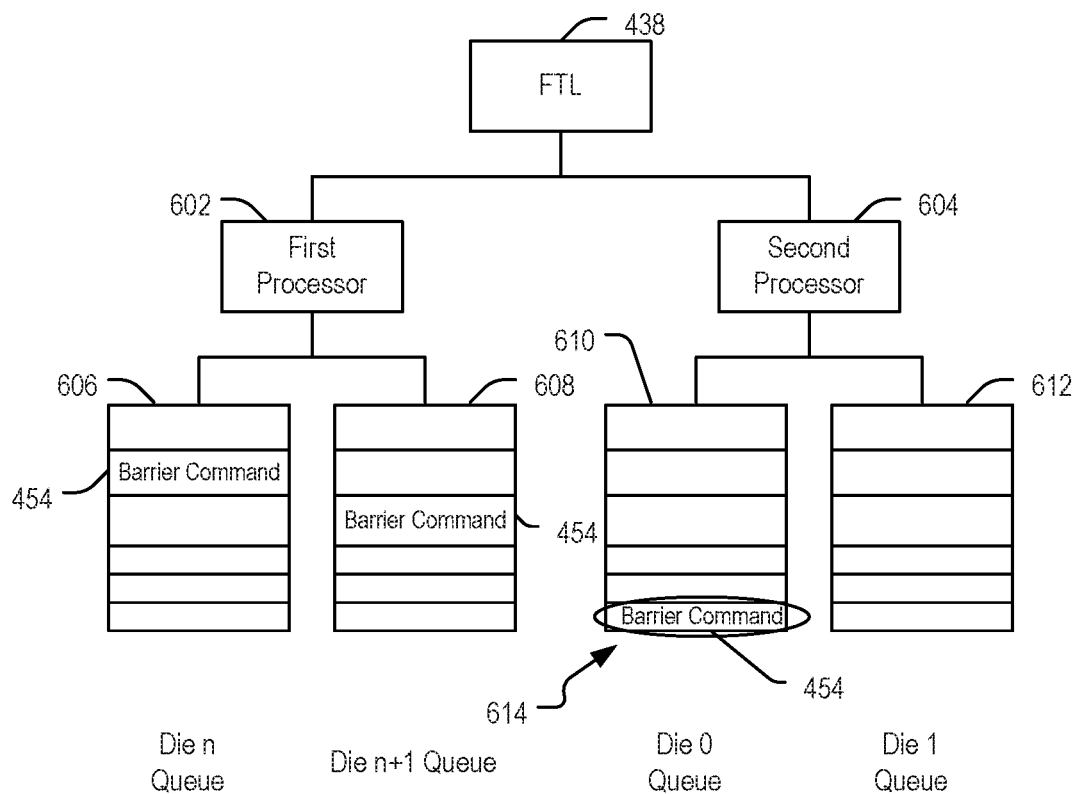
FIG. 6 is a diagram depicting certain illustrative aspects of an example of the data storage device of FIG. 4.

The example of FIG. 5 illustrates that a barrier command (e.g., the barrier command 454) may be used in connection with writing a log to a memory, such as the non-volatile memory 404. The barrier command may ensure that previous memory commands are executed before the barrier command and that subsequent memory commands are executed after the barrier command, maintaining coherence of the log with respect to the memory commands FIG. 6 depicts illustrative aspects of the data storage device 402 of FIG. 4. In FIG. 6, operations are described with reference to the FTL 438 of FIG. 4, a first processor 602, and a second processor 604. Operations are also described with reference to a command queue 606, a command queue 608, a command queue 610, and a command queue 612.

During operation, the processors 602, 604 may be responsive to the FTL 438. For example, the FTL 438 may provide an indication to the processors 602, 604 to generate a barrier command, such as the barrier command 454. In the example of FIG. 6, each of the command queues 606, 608, 610, and 612 may be associated with a particular memory die of the non-volatile memory 404. As an illustrative example, the command queue 606 may be associated with a memory die n (e.g., the first memory die 406), and the command queue 608 may be associated with a memory die n+1 (e.g., the second memory die 408), where n is a positive integer. The command queue 610 may be associated with a memory die 0, and the command queue 612 may be associated with a memory die 1.

During execution of commands, barrier command 454 may propagate through each of the command queues 608, 608, 610, and 612 (e.g., by "moving up in the queue" in response to execution of a preceding instruction). Due to different die characteristics, such as different die workloads or different die write speeds, certain memory dies of the non-volatile memory 404 may reach the barrier command 454 prior to other memory dies of the non-volatile memory 404. For example, in FIG. 6, the command queue 608 may indicate that the barrier command 454 is ready for execution prior to the command queue 610 indicating that the barrier command 454 is ready for execution.

Each memory die executing the barrier command 454 may provide a respective message of the one or more messages 426 to the controller 430 of FIG. 4. To illustrate, FIG. 6 depicts that a particular memory die corresponding to the command queue 610 may send a particular message, such as a die barrier response, at 614. In a particular example, sending the die barrier response at 614 causes a number of the one or more messages 426 to satisfy the threshold 448. In this example, the controller 430 may initiate sending of the updated control information 424 to the non-volatile memory 404 in response to receiving the die barrier response from each of the memory dies n, n+1, 0, and 1. In this illustrative example, the threshold 448 may correspond to four. As a result of the number of the one or more messages 426 satisfying the threshold 448, the controller 430 may detect that the updated control information 424 is to be sent to the non-volatile memory 404, maintaining coherence of the updated control information 424 with respect to memory operations performed at the non-volatile memory 404.

Figure 7:
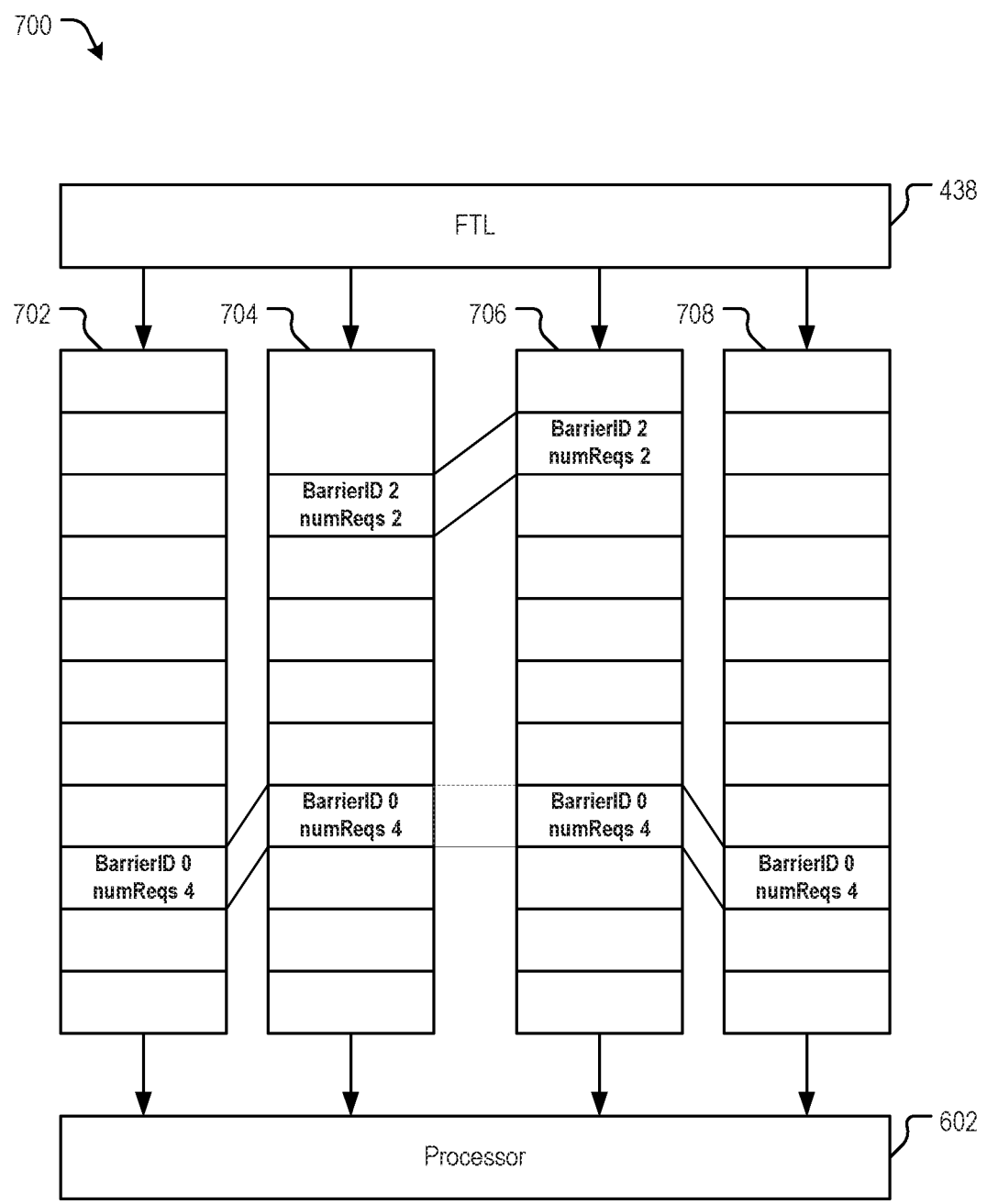
FIG. 7 is a diagram of a device that may be included in the data storage device of FIG. 4.

Referring to FIG. 7, illustrative aspects of a device are depicted and generally designated 700. One or more aspects of the device 700 of FIG. 7 may be integrated within the controller 430 of FIG. 4. For example, FIG. 7 depicts the FTL 438 of FIG. 4 and the first processor 602 of FIG. 6.

In FIG. 7, multiple queues are coupled between the FTL 438 and the processor 602. For example, FIG. 7 depicts that a queue 702, a queue 704, a queue 706, and a queue 708 may be coupled between the FTL 438 and the processor 602.

The example of FIG. 7 shows multiple barrier commands associated with different numbers of messages. To illustrate, the example of FIG. 7 depicts a first barrier command associated with a first barrier identification ("barrierID") of zero. The first barrier command is associated with a first number ("numReqs") of one or more messages that is equal to four (e.g., because the first barrier command may be provided to four memory dies in the example of FIG. 7). As another example, FIG. 7 also depicts a second barrier command that is associated with a second barrier ID of two and that is associated with a second number of one or more messages equal to two (e.g., because the second barrier command may be provided to two memory dies in the example of FIG. 7).

Any of the barrier commands of FIG. 7 may correspond to the barrier command 454 of FIG. 4, and any of the numbers of messages described with reference to FIG. 7 may correspond to the threshold 448 of FIG. 4. Each of the queues 702, 704, 706, and 708 may be associated with a corresponding die of the non-volatile memory 404.

The example of FIG. 7 illustrates that multiple barrier messages may be used, where each of the barrier messages is associated with a corresponding identification (barrierID) and a corresponding number of messages (numReqs). As a result, the controller 430 of FIG. 4 may concurrently schedule multiple operations that use barrier completion and that include one or more CS operations. Depending on the particular example, the multiple operations may include one or more flush operations, one or more dependent control operations that depend on completion of previous operations, one or more other operations, or a combination thereof.

Figure 8:
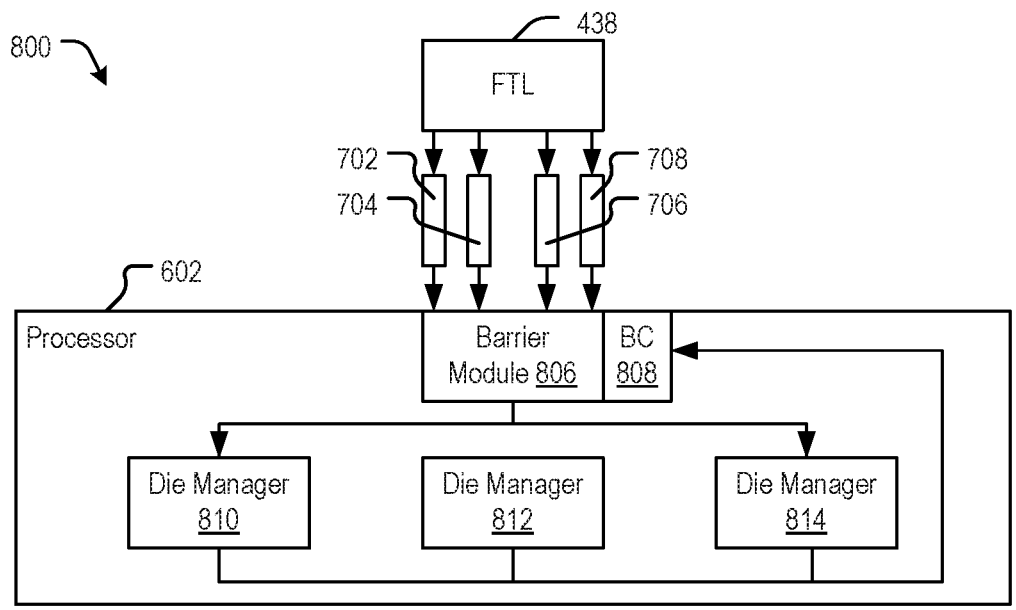
FIG. 8 is a diagram of illustrative aspects of the device of FIG. 7.

Referring to FIG. 8, illustrative aspects of the device 700 of FIG. 7 are depicted and generally designated 800. The device 800 of FIG. 8 may be included in the data storage device 402 of FIG. 4.

In the example of FIG. 8, the first processor 602 includes a barrier module 806 and a barrier counter (BC) 808. In a particular example, the barrier module 806 corresponds to the control circuit 440, and the BC 808 corresponds to the counter 446 of FIG. 4.

In the example of FIG. 8, the first processor 602 further includes a first die manager 810, a second die manager 812, and a third die manager 814. Each of the die managers 810, 812, and 814 may be associated with a corresponding memory die of the non-volatile memory 404. As an illustrative example, the first die manager 810 may manage memory operations performed at the first memory die 406, and the second die manager 812 may control memory operations at the second memory die 408 of FIG. 4.

In the example of FIG. 8, the die managers 810, 812, and 814 may be configured to receive messages from memory dies of the non-volatile memory 404. To illustrate, the first die manager 810 may be configured to receive a first message of the one or more messages 426 from the first memory die 406, and the second die manager 812 may be configured to receive a second message of the one or more messages 426 from the second memory die 408. Each of the die managers 810, 812, and 814 may be configured to increment the BC 808, and the barrier module 806 may be configured to detect when a value indicated by the BC 808 (e.g., the value 450 of the counter 446) satisfies the threshold 448.

Figure 9:
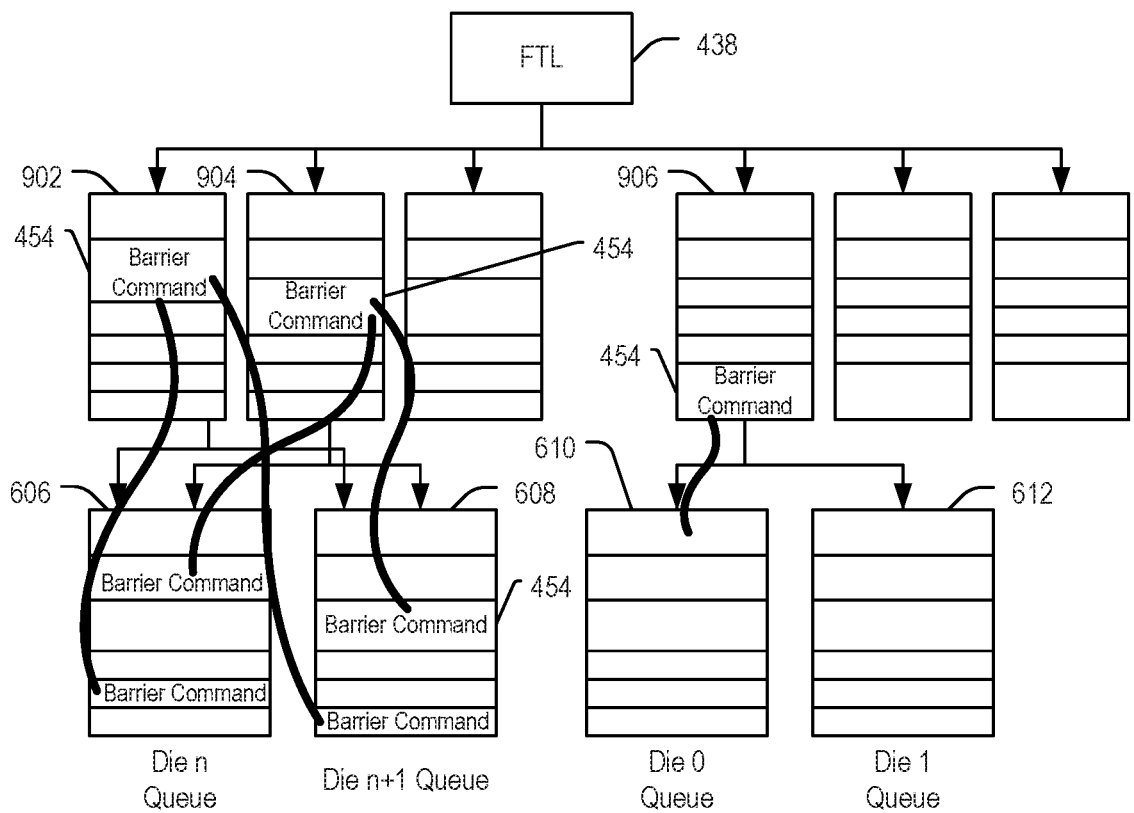
FIG. 9 is a diagram depicting additional illustrative aspects of an example of the data storage device of FIG. 4.

FIG. 9 depicts illustrative aspects of the data storage device 402 of FIG. 4. In FIG. 9, operations are described with reference to the FTL 438 of FIG. 4 and a set of queues, such as the command queues 606, 608, 610, and 612. FIG. 9 also illustrates that the set of queues may further include a queue 902, a queue 904, and a queue 906.

The set of queues of FIG. 9 may have a hierarchical configuration. For example, the queues 606, 608, 610, and 612 may correspond to a "lower" level of a hierarchy, and the queues 902, 904 may correspond to a "higher" level of the hierarchy. Each "higher" level queue may be connected to multiple "lower" level queues. For example, the queue 902 is connected to the queues 606, 608. As additional examples, the queue 904 is connected to the queues 606, 608, and the queue 906 is connected to the queues 610, 612.

In the example of FIG. 9, the FTL 438 may send a barrier command to one or more queues of the set of queues. A barrier command sent to a "higher" queue may be propagated to one or more "lower" queues. For example, FIG. 9 illustrates that the barrier command 454 may be propagated from the queue 902 to the queues 606, 608. As another example, FIG. 9 depicts that the barrier command 454 may be propagated from the queue 904 to the queues 606, 608. In response to execution of each of the barrier commands 454, a completion message may be forwarded to FTL 438.

Figure 10:
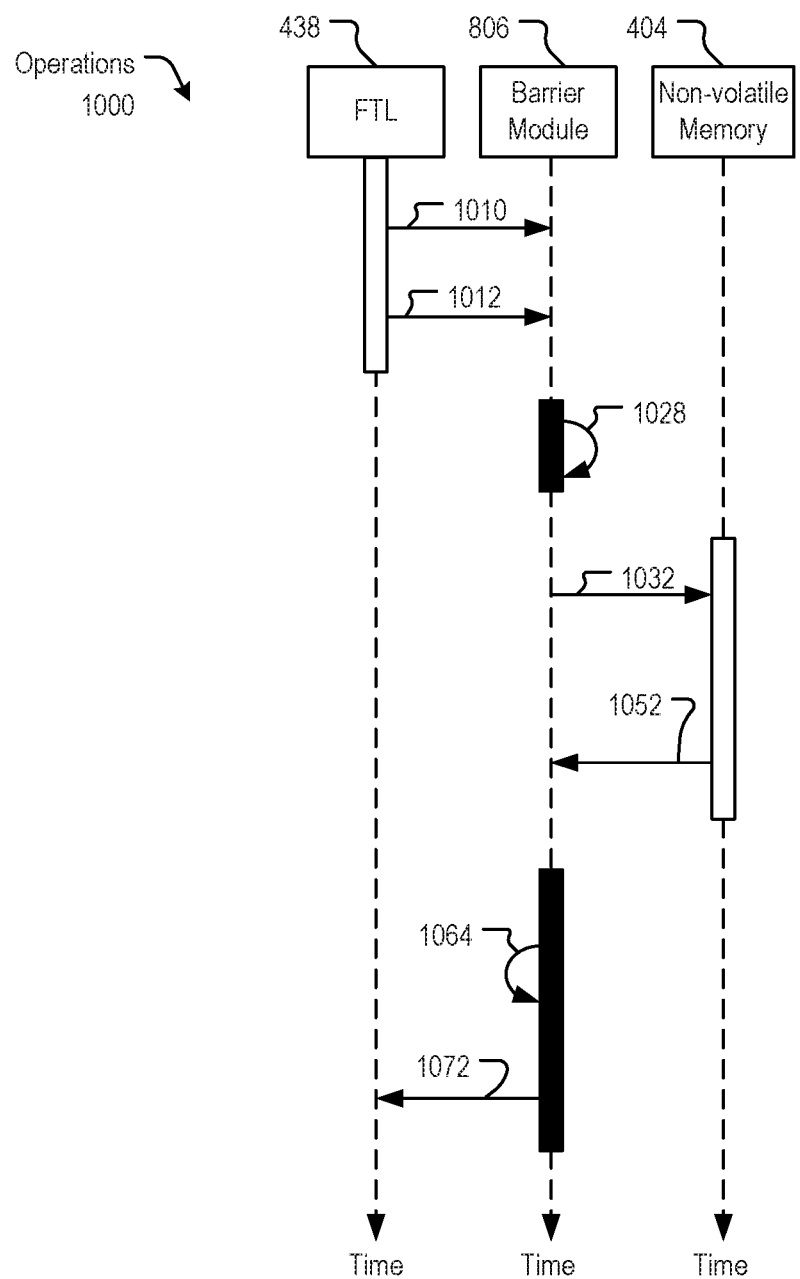
FIG. 10 is a diagram illustrating certain operations that may be performed by the data storage device of FIG. 4.

Referring to FIG. 10, a diagram illustrating operations of a data storage device is depicted and generally designated 1000. In an illustrative example, the operations 1000 may be performed by the data storage device 402 of FIG. 4. In the example of FIG. 10, the operations 1000 are described with reference to the non-volatile memory 404, the FTL 438, and the barrier module 806.

The operations 1000 may include generating a pre-barrier request, at 1010. For example, the FTL 438 may notify the barrier module 806 that the FTL 438 is to provide a barrier command to the barrier module 806.

The operations 1000 may further include generating a barrier request, at 1012. For example, the barrier request may correspond to the barrier command 454. The FTL 438 may provide the barrier request to the barrier module 806. In some implementations, the barrier module 806 may fetch the barrier request from the FTL 438. In some examples, the barrier module 806 may provide a barrier ID to the barrier module 806 in connection with the barrier request. For example, the barrier ID may correspond to any of the barrier IDs described with reference to FIG. 7.

The operations 1000 may further include initializing a counter, at 1028. For example, the value 450 of the counter 446 may be reset in response to issuance of the barrier command 454.

The operations 1000 further include providing a barrier service request, at 1032. The barrier service request may be provided by the barrier module 806 to the non-volatile memory 404, such as to a die state machine that may be included in the first memory die 406 or the second memory die 408, as illustrative examples.

The operations 1000 may further include providing a completion message to the barrier module 806, at 1052. The counter may be decremented, at 1064, such as by decrementing the value 450 of the counter 446. The operations 1000 may further include sending a completion message (e.g., to an FTL mailbox associated with the FTL 438 of FIG. 4), at 1072. For example, the completion message may correspond to a particular message of the one or more messages 426 of FIG. 4.

Figure 11:
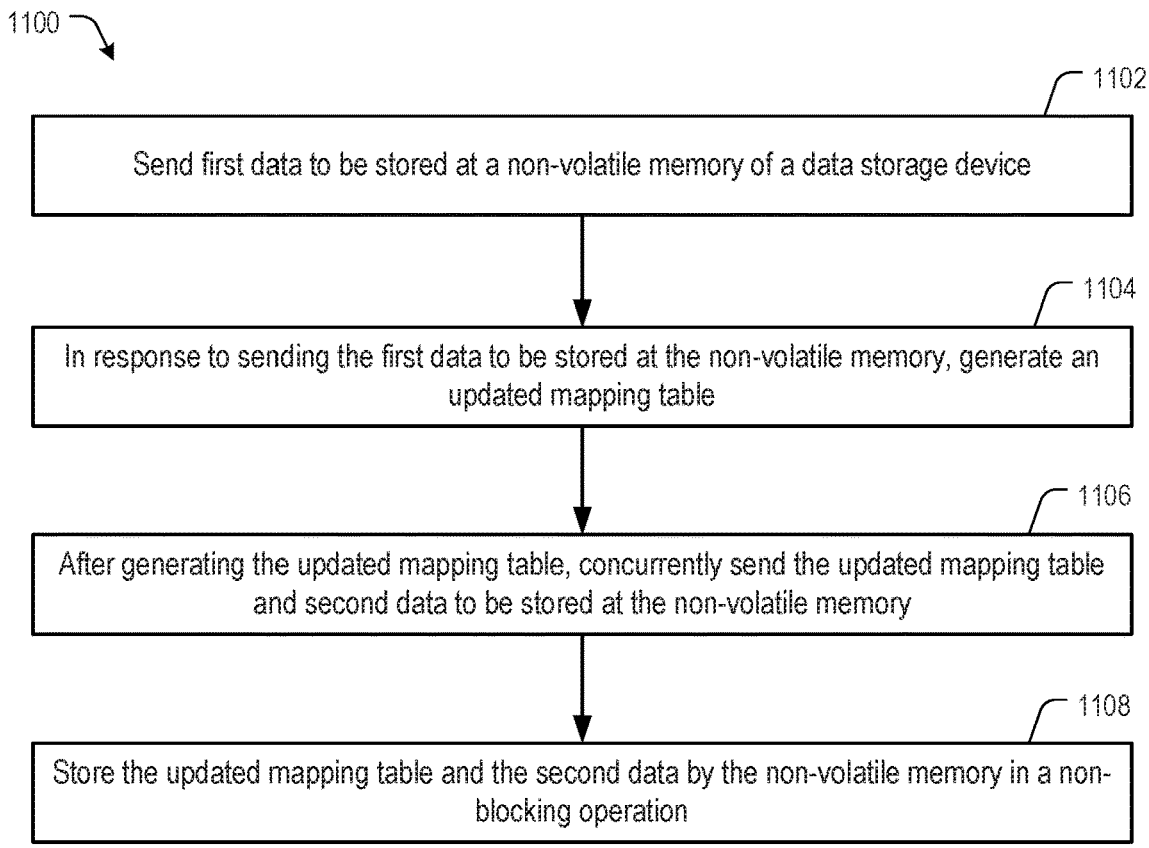
FIG. 11 is a flow chart of a particular illustrative example of a method of operation of the data storage device of FIG. 1.

Referring to FIG. 11, an illustrative example of a method of operation of a data storage device is depicted and generally designated 1100. In an illustrative example, the method 1100 is performed by the data storage device 102 of FIG. 1.

The method 1100 includes sending first data to be stored at a non-volatile memory of a data storage device, at 1102. For example, the controller 130 may send the first data 120 to be stored at the non-volatile memory 104 of the data storage device 102.

The method 1100 further includes generating, in response to sending the first data to be stored at the non-volatile memory, an updated mapping table, at 1104. For example, the control circuit 140 may be configured to access the control information 184 at the volatile memory 144 and to update the mapping table 186 to generate the updated control information 124.

The method 1100 further includes concurrently sending the updated mapping table and second data to be stored at the non-volatile memory after generating the updated mapping table, at 1106. For example, the controller 130 may send the second data 122 and the updated control information 124 to the non-volatile memory 104.

The method 1100 further includes storing the updated mapping table and the second data by the non-volatile memory in a non-blocking operation (e.g., a non-blocking CS operation where memory dies are not halted), at 1108. To illustrate, the non-volatile memory 104 may continue operations during storing of the updated control information 124 and the second data 122 (e.g., without "halting" the operations during a CS operation that writes the updated control information 124 to the non-volatile memory 104).

Figure 12:
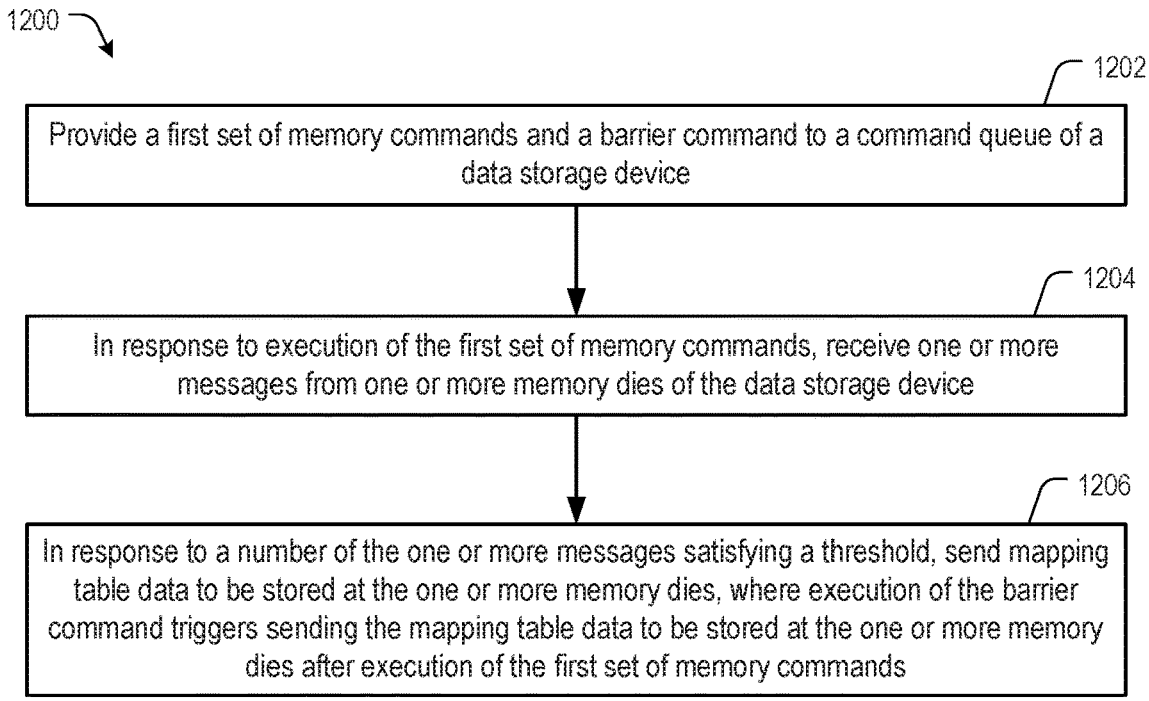
FIG. 12 is a flow chart of a particular illustrative example of a method of operation of the data storage device of FIG. 4.

Referring to FIG. 12, an illustrative example of a method of operation of a data storage device is depicted and generally designated 1200. In an illustrative example, the method 1200 is performed by the data storage device 402 of FIG. 4.

The method 1200 includes providing a first set of memory commands and a barrier command to a command queue of a data storage device, at 1202. For example, the first set of memory commands 452 and the barrier command 454 may be provided to the command queue 442 of FIG. 4.

The method 1200 further includes receiving, in response to execution of the first set of memory commands, one or more messages from one or more memory dies of the data storage device, at 1204. For example, the memory dies 406, 408 may provide the one or more messages 426 in response to executing the barrier command 454 (and after executing the first set of memory commands 452).

The method 1200 further includes sending, in response to a number of the one or more messages satisfying a threshold, mapping table data to be stored at the one or more memory dies, at 1206. Execution of the barrier command triggers sending the mapping table data to be stored at the one or more memory dies after execution of the first set of memory commands To illustrate, the controller 430 may send the updated mapping table 428 to the non-volatile memory 404 in response to a number of the one or more messages 426 satisfying the threshold 448.

The method 1200 may further include performing continuous processing of user data written to the non-volatile memory by memory dies of the non-volatile memory during non-blocking control sync operations. For example, the non-volatile memory 404 may perform one or more additional non-blocking control sync operations after storing the mapping table 428 to the non-volatile memory 404, such as by re-updating the mapping table 428 and re-storing the mapping table 428 to the non-volatile memory 404 in a non-blocking manner (e.g., while performing continuous processing of user data written to the non-volatile memory 404 and without "blocking" writing of the user data to the non-volatile memory 404).

In conjunction with the described embodiments, an apparatus includes means (e.g., the non-volatile memory 104) for storing data. The apparatus further includes means (e.g., the control circuit 140) for generating an updated mapping table (e.g., the updated control information 124) in response to sending first data (e.g., the first data 120) to be stored at the means for storing data. The apparatus further includes means (e.g., the memory interface 132) for concurrently sending the updated mapping table and second data to the means for storing data.

In conjunction with the described embodiments, an apparatus includes means (e.g., the command queue 442) for storing a first set of memory commands (e.g., the first set of memory commands 452) and a barrier command (e.g., the barrier command 454). The apparatus further includes means (e.g., the memory interface 432) for receiving one or more messages (e.g., the one or more messages 426) from one or more memory dies (e.g., the first memory die 406, the second memory die 408, one or more other memory dies, or a combination thereof) in response to execution of the first set of memory commands The apparatus further includes means (e.g., the control circuit 440) for detecting that a number of the one or more messages satisfies a threshold (e.g., the threshold 448) and for initiating sending of mapping table data (e.g., the updated mapping table 428) to be stored at the one or more memory dies in response to detecting that the number of the one or more messages satisfies the threshold. The apparatus may further include means (e.g., the counter 446) for storing an indication (e.g., the value 450) of the number of the one or more messages.

Although various components depicted herein are illustrated as block components and described in general terms, such components may include one or more microprocessors, state machines, or other circuits configured to enable such components to perform one or more operations described herein. For example, one or more aspects of the controllers 130, 430 may represent physical components, such as hardware controllers, state machines, logic circuits, or other structures, to enable the controllers 130, 430 to perform non-blocking CS operations.

Alternatively or in addition, certain aspects of the data storage device 102 may be implemented using a microprocessor or microcontroller. In a particular embodiment, one or more aspects of the controllers 130, 430 may be implemented using a processor executing instructions (e.g., firmware) that are stored at the non-volatile memories 104, 404. Alternatively, or in addition, executable instructions that are executed by the processor may be stored at a separate memory location that is not part of the non-volatile memories 104, 404, such as at a read-only memory (ROM) that may be included in the controllers 130, 430.

The data storage devices 102, 402 may be coupled to, attached to, or embedded within one or more accessing devices, such as within a housing of the device 180. For example, the data storage devices 102, 402 may be embedded within the devices 180, 480 in accordance with a Joint Electron Devices Engineering Council (JEDEC) Solid State Technology Association Universal Flash Storage (UFS) configuration. To further illustrate, the data storage devices 102, 402 may be integrated within an electronic device (e.g., the device 180 or the device 480), such as a mobile telephone, a computer (e.g., a laptop, a tablet, or a notebook computer), a music player, a video player, a gaming device or console, an electronic book reader, a personal digital assistant (PDA), a portable navigation device, or other device that uses internal non-volatile memory.

In one or more other implementations, the data storage devices 102, 402 may be implemented in a portable device configured to be selectively coupled to one or more external devices, such as a host device. For example, the data storage devices 102, 402 may be removable from the devices 180, 480 (i.e., "removably" coupled to the devices 180, 480). As an example, the data storage devices 102, 402 may be removably coupled to the devices 180, 480 in accordance with a removable universal serial bus (USB) configuration.

The devices 180, 480 may correspond to a mobile telephone, a computer (e.g., a laptop, a tablet, or a notebook computer), a music player, a video player, a gaming device or console, an electronic book reader, a personal digital assistant (PDA), a portable navigation device, another electronic device, or a combination thereof. The devices 180, 480 may communicate via a controller, which may enable the devices 180, 480 to communicate with the data storage devices 102, 402. The devices 180, 480 may operate in compliance with a JEDEC Solid State Technology Association industry specification, such as an embedded MultiMedia Card (eMMC) specification or a Universal Flash Storage (UFS) Host Controller Interface specification. The devices 180, 480 may operate in compliance with one or more other specifications, such as a Secure Digital (SD) Host Controller specification as an illustrative example. Alternatively, the devices 180, 480 may communicate with the data storage devices 102, 402 in accordance with another communication protocol. In some implementations, the data storage devices 102, 402 may be integrated within a network-accessible data storage system, such as an enterprise data system, an NAS system, or a cloud data storage system, as illustrative examples.

In some implementations, one or both of the data storage devices 102, 402 may include a solid state drive (SSD). One or both of the data storage devices 102, 402 may function as an embedded storage drive (e.g., an embedded SSD drive of a mobile device), an enterprise storage drive (ESD), a cloud storage device, a network-attached storage (NAS) device, or a client storage device, as illustrative, non-limiting examples. In some implementations, one or both of the data storage devices 102, 402 may be coupled to the devices 180, 480 via a network. For example, the network may include a data center storage system network, an enterprise storage system network, a storage area network, a cloud storage network, a local area network (LAN), a wide area network (WAN), the Internet, and/or another network.

To further illustrate, one or both of the data storage devices 102, 402 may be configured to be coupled to the devices 180, 480 as embedded memory, such as in connection with an embedded MultiMedia Card (eMMC®) (trademark of JEDEC Solid State Technology Association, Arlington, Va.) configuration, as an illustrative example. One or both of the data storage devices 102, 402 may correspond to an eMMC device. As another example, one or both of the data storage devices 102, 402 may correspond to a memory card, such as a Secure Digital (SD®) card, a microSD® card, a miniSD™ card (trademarks of SD-3C LLC, Wilmington, Del.), a MultiMediaCard™ (MMC™) card (trademark of JEDEC Solid State Technology Association, Arlington, Va.), or a CompactFlash® (CF) card (trademark of SanDisk Corporation, Milpitas, Calif.). One or both of the data storage devices 102, 402 may operate in compliance with a JEDEC industry specification. For example, the data storage devices 102, 402 may operate in compliance with a JEDEC eMMC specification, a JEDEC Universal Flash Storage (UFS) specification, one or more other specifications, or a combination thereof.

The non-volatile memories 104, 404 may include a resistive random access memory (ReRAM), a flash memory (e.g., a NAND memory, a NOR memory, a single-level cell (SLC) flash memory, a multi-level cell (MLC) flash memory, a divided bit-line NOR (DINOR) memory, an AND memory, a high capacitive coupling ratio (HiCR) device, an asymmetrical contactless transistor (ACT) device, or another flash memory), an erasable programmable read-only memory (EPROM), an electrically-erasable programmable read-only memory (EEPROM), a read-only memory (ROM), a one-time programmable memory (OTP), another type of memory, or a combination thereof. The non-volatile memories 104, 404 may include a semiconductor memory device.

Semiconductor memory devices include volatile memory devices, such as dynamic random access memory ("DRAM") or static random access memory ("SRAM") devices, non-volatile memory devices, such as resistive random access memory ("ReRAM"), magnetoresistive random access memory ("MRAM"), electrically erasable programmable read only memory ("EEPROM"), flash memory (which can also be considered a subset of EEPROM), ferroelectric random access memory ("FRAM"), and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are exemplary, and memory elements may be otherwise configured.

The semiconductor memory elements located within and/or over a substrate may be arranged in two or three dimensions, such as a two dimensional memory structure or a three dimensional memory structure. In a two dimensional memory structure, the semiconductor memory elements are arranged in a single plane or a single memory device level. Typically, in a two dimensional memory structure, memory elements are arranged in a plane (e.g., in an x-z direction plane) which extends substantially parallel to a major surface of a substrate that supports the memory elements. The substrate may be a wafer over or in which the layer of the memory elements are formed or it may be a carrier substrate which is attached to the memory elements after they are formed. As a non-limiting example, the substrate may include a semiconductor such as silicon.

The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bit lines and word lines.

A three dimensional memory array is arranged so that memory elements occupy multiple planes or multiple memory device levels, thereby forming a structure in three dimensions (i.e., in the x, y and z directions, where the y direction is substantially perpendicular and the x and z directions are substantially parallel to the major surface of the substrate). As a non-limiting example, a three dimensional memory structure may be vertically arranged as a stack of multiple two dimensional memory device levels. As another non-limiting example, a three dimensional memory array may be arranged as multiple vertical columns (e.g., columns extending substantially perpendicular to the major surface of the substrate, i.e., in the y direction) with each column having multiple memory elements in each column. The columns may be arranged in a two dimensional configuration, e.g., in an x-z plane, resulting in a three dimensional arrangement of memory elements with elements on multiple vertically stacked memory planes. Other configurations of memory elements in three dimensions can also constitute a three dimensional memory array.

By way of non-limiting example, in a three dimensional NAND memory array, the memory elements may be coupled together to form a NAND string within a single horizontal (e.g., x-z) memory device levels. Alternatively, the memory elements may be coupled together to form a vertical NAND string that traverses across multiple horizontal memory device levels. Other three dimensional configurations can be envisioned wherein some NAND strings contain memory elements in a single memory level while other strings contain memory elements which span through multiple memory levels. Three dimensional memory arrays may also be designed in a NOR configuration and in a ReRAM configuration.

Typically, in a monolithic three dimensional memory array, one or more memory device levels are formed above a single substrate. Optionally, the monolithic three dimensional memory array may also have one or more memory layers at least partially within the single substrate. As a non-limiting example, the substrate may include a semiconductor such as silicon. In a monolithic three dimensional array, the layers constituting each memory device level of the array are typically formed on the layers of the underlying memory device levels of the array. However, layers of adjacent memory device levels of a monolithic three dimensional memory array may be shared or have intervening layers between memory device levels.

Alternatively, two dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic three dimensional memory arrays. Further, multiple two dimensional memory arrays or three dimensional memory arrays (monolithic or non-monolithic) may be formed on separate chips and then packaged together to form a stacked-chip memory device.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements.

One of skill in the art will recognize that this disclosure is not limited to the two dimensional and three dimensional exemplary structures described but cover all relevant memory structures within the spirit and scope of the disclosure as described herein and as understood by one of skill in the art. The illustrations of the embodiments described herein are intended to provide a general understanding of the various embodiments. Other embodiments may be utilized and derived from the disclosure, such that structural and logical substitutions and changes may be made without departing from the scope of the disclosure. This disclosure is intended to cover any and all subsequent adaptations or variations of various embodiments. Those of skill in the art will recognize that such modifications are within the scope of the present disclosure.

The above-disclosed subject matter is to be considered illustrative, and not restrictive, and the appended claims are intended to cover all such modifications, enhancements, and other embodiments, that fall within the scope of the present disclosure. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method of operation of a non-blocking control sync operation in a data storage device, comprising:
   detecting, by a controller, a trigger event for the non-blocking control sync operation for user data, wherein the trigger event is determined by reaching a threshold time duration, wherein the threshold time duration comprises a time since previously updating and storing control information;
   detecting a trigger event for the non-blocking control sync operation;
   when the trigger event is detected, creating the log file that includes control information updates which correspond to processed memory commands, wherein creating the log file comprises generating a mapping table of the updated control information;
   providing, by the controller, barrier commands to a plurality of command queues of the data storage device;
   generating, by a control circuit, an indication as a response to detecting the trigger event;
   providing, by a flash translation layer (FTL), the indication to a plurality of processors;
   generating, by the plurality of processors, a barrier command, wherein the barrier command propagates through all of the plurality of command queues until reaching the one or more memory dies;
   propagating the barrier commands through all of the plurality of command queues;
   accumulating, by the controller, response messages for completion of the barrier commands from all of the plurality of command queues of the data storage device;
   sending, by the controller, a log file including a mapping table data to one or more memory dies maintaining a coherence of data and control information; and
   writing the user data and the log file to the one or more memory dies continuously during the non-blocking control sync operation.

2. The method of claim 1, further comprising:
   transmitting a set of memory commands to all of the plurality of command queues after providing the barrier command, wherein the set of memory commands are written to the one or more memory dies continuously including during the non-blocking control sync operation.

3. The method of claim 1, further comprising:
   setting a threshold according to a number of all of the plurality of command queues;
   receiving, by the controller, one or more completion messages;
   adjusting a value indicated by a counter in response to receiving each of one or more completion messages;
   comparing the value to the threshold to determine a number satisfies the threshold;
   when a number of the one or more completion messages satisfies the threshold, sending the log file to the one or more memory dies; and
   writing the log file to the one or more memory dies.

4. The method of claim 1, further comprising:
   providing a plurality of processors, wherein each processor of the plurality of processors provides the barrier command propagated through all of the plurality of command queues, wherein the barrier command has corresponding barrier identification and threshold numbers.

5. The method of claim 1, further comprising:
collecting messages from all of the plurality of command queues for adjusting a plurality of counter values.

6. The method of claim 1, further comprising:
providing multiple number of die managers, wherein each die manager is configured to receive messages from a die and increment a counter.

7. A method of operation of a data storage device, comprising:
sending, by a controller, first data to a non-volatile memory of the data storage device;
storing the first data at the non-volatile memory of the data storage device;
detecting, by a controller, a trigger event, wherein the trigger event corresponds with a threshold time duration, wherein the threshold time duration comprises a time since previously updating and storing control information;
providing, by a flash translation layer (FTL), an indication to a plurality of processors, wherein the plurality of processors generates a barrier command, and wherein the controller sends the barrier command to the non-volatile memory to be executed;
generating, by the controller, an updated control information based on the storing of the first data to the non-volatile memory, wherein the generated updated control information includes a mapping table;
in response to the sending of the first data to the non-volatile memory, generating, by the controller, an updated mapping table;
after generating the updated mapping table and executing the barrier command, concurrently sending, by the controller, the updated mapping table and second data to the non-volatile memory; and
storing, by the controller, the updated mapping table and the second data in a non-blocking operation.

8. The method of claim 7, wherein the second data is sent to the non-volatile memory to initiate a write operation.

9. The method of claim 7, wherein the updated mapping table is sent to the non-volatile memory to initiate a non-blocking control sync (CS) operation.

10. The method of claim 7, further comprising:
receiving a completion acknowledgment in response to sending the first data, wherein the updated mapping table is generated in response to the completion acknowledgement.

* * * * *